(12) United States Patent
Debnath

(10) Patent No.: US 12,516,894 B2
(45) Date of Patent: Jan. 6, 2026

(54) FAST COOLING OF ION MOTION IN A LONG CHAIN USING LOCAL MODES

(71) Applicant: IonQ, Inc., College Park, MD (US)

(72) Inventor: Shantanu Debnath, College Park, MD (US)

(73) Assignee: IonQ, Inc., College Park, MD (US)

( * ) Notice: Subject to any disclaimer, the term of this patent is extended or adjusted under 35 U.S.C. 154(b) by 0 days.

(21) Appl. No.: 18/394,560

(22) Filed: Dec. 22, 2023

(65) Prior Publication Data
US 2024/0127091 A1 Apr. 18, 2024

Related U.S. Application Data

(63) Continuation of application No. 17/069,120, filed on Oct. 13, 2020, now Pat. No. 11,954,560.

(60) Provisional application No. 62/929,374, filed on Nov. 1, 2019.

(51) Int. Cl.
*F28F 99/00* (2006.01)
*G06F 1/20* (2006.01)
*H01J 49/00* (2006.01)

(52) U.S. Cl.
CPC .......... *F28F 99/00* (2013.01); *H01J 49/0072* (2013.01); *G06F 1/20* (2013.01)

(58) Field of Classification Search
CPC ........ G06N 10/00; H01J 49/0072; G06F 1/20; H05H 7/00; H05H 2007/005
See application file for complete search history.

(56) References Cited

U.S. PATENT DOCUMENTS

| | | | | |
|---|---|---|---|---|
| 8,633,436 B2 * | 1/2014 | Ugarov | ................... | H01J 49/40 |
| | | | | 250/281 |
| 9,858,531 B1 * | 1/2018 | Monroe | ................. | G06N 10/00 |
| 10,622,978 B1 * | 4/2020 | Debnath | ................ | G06N 10/00 |
| 11,033,981 B2 * | 6/2021 | Amini | .................... | G06N 10/00 |

(Continued)

FOREIGN PATENT DOCUMENTS

| CN | 101320016 A | * 12/2008 | ............ H01J 49/004 |
|---|---|---|---|
| CN | 109450685 A | 3/2019 | |

OTHER PUBLICATIONS

Toyoda, K., et al., "Hony-Ou-Mandiel interference of two phonons in trapped ions", Nature, vol. 527, Nov. 5, 2015, pp. 74-79.

(Continued)

*Primary Examiner* — David A Vanore
(74) *Attorney, Agent, or Firm* — ARENTFOX SCHIFF LLP

(57) ABSTRACT

Aspects of the present disclosure describe techniques for fast cooling of ion motion in a long chain using local motional modes. For example, a method is described for cooling down ions in a chain of ions that includes performing a cooling down sequence in which phonons are removed from the ions in the chain of ions by exciting and de-exciting local motional modes associated with individual ions, wherein sideband transitions that are part of the cooling down sequence are driven faster for the local motional modes than for collective motional modes for the same chain of ions; and completing the cooling down sequence when the local motional modes reach a ground state. A corresponding system and computer-readable storage medium for fast cooling of ion motion in a long chain using local motional modes are also described.

16 Claims, 8 Drawing Sheets

(56) References Cited

U.S. PATENT DOCUMENTS

| | | | |
|---|---|---|---|
| 11,334,811 B2* | 5/2022 | Amini | G06N 10/00 |
| 11,954,560 B2* | 4/2024 | Debnath | H01J 49/0072 |
| 2006/0024720 A1* | 2/2006 | McLean | G01N 33/6851 435/7.1 |
| 2010/0237236 A1* | 9/2010 | Thomson | H01J 49/427 250/283 |
| 2013/0161506 A1* | 6/2013 | Ugarov | G01N 27/623 250/282 |
| 2014/0119593 A1 | 5/2014 | Filer | |
| 2019/0138928 A1 | 5/2019 | Monroe et al. | |
| 2019/0212766 A1* | 7/2019 | Monroe | B82Y 40/00 |
| 2019/0378033 A1* | 12/2019 | Figgatt | G06N 10/40 |
| 2020/0005178 A1* | 1/2020 | Amini | G06N 10/00 |
| 2020/0023462 A1* | 1/2020 | Amini | B23K 26/064 |
| 2020/0082291 A1* | 3/2020 | Debnath | G02F 1/113 |
| 2020/0321949 A1* | 10/2020 | Debnath | H03K 3/38 |
| 2021/0133616 A1* | 5/2021 | Debnath | H01J 49/0072 |
| 2022/0222561 A1* | 7/2022 | Amini | G06N 10/00 |

OTHER PUBLICATIONS

Toyoda, K., et al. "Experimental Realization of a Quantum Phase Transition of Polaritonic Excitations", American Physical Society, Physical Review Letters, published Oct. 14, 2013, pp. 1605011-1605015.

Debnath, S., et al., "Observation of Hopping and Blockade of Boson in a Trapped Ion Spin Chain", American Physical Society, Physical Review Letters, published Feb. 12, 2018.

GB Search Report for Application No. GB1411192.6, dated Jan. 27, 2021, 3 pages.

Rohde, H. et al., Sympathetic ground-state cooling and coherent manipulation with two-ion crystals, retrieved at https://iopscience.iop.org/journal/1464-4266, Journal of Optics B: Quantum and Semi-classical Optics, vol. 3, No. 1, Sep. 2000, 15 pages.

Debnath, S., et al., Observation of hopping and blockade of bosons in a trapped ion spin chain, Physical Review Letters 120, Feb. 2018, 8 pages.

International Search Report and Written Opinion for PCT/US2020/055610, dated Jan. 29, 2021, 17 pages.

Office Action in CN202080077677.9, mailed Sep. 20, 2023, 5 pages.

* cited by examiner

FAST COOLING OF ION MOTION IN A LONG CHAIN USING LOCAL MODES

CROSS-REFERENCE TO RELATED APPLICATIONS

The current application is a continuation application of U.S. patent application Ser. No. 17/069,120, filed on Oct. 13, 2020, entitled "FAST COOLING OF ION MOTION IN A LONG CHAIN USING LOCAL MODES," which claims priority to U.S. Provisional Application No. 62/929,374, filed on Nov. 1, 2019, entitled "FAST COOLING OF ION MOTION IN A LONG CHAIN USING LOCAL MODES," the contents of which are hereby incorporated by reference in their entireties.

BACKGROUND

Aspects of the present disclosure relate generally to the cooling of ions in a chain, and more specifically, to the fast cooling of ion motion in a long chain using local modes.

The cooling of all of the collective motional modes of a trapped ion chain, such as the one used in a trapped ion quantum computer or a quantum information processing (QIP) system, is necessary for reliable high fidelity qubit operations. The cooling process is usually implemented by coherently driving motional sideband transitions to remove motional excitations or phonons from each of these collective motional modes. This requires driving sideband transitions at a rate slow enough such that each collective motional mode can be individually addressed without exciting neighboring collective motional modes while cooling them at the same time. As the size of a trapped ion processor is increased, that is, as the number of qubits or ions in the chain increases, the process of sideband cooling of the collective motional modes takes longer to achieve the cooling of all of the collective motional modes of the chain. This can prevent achieving the motional ground state of each of the collective motional modes because of a competing rate of heating of the trapped ions, leading to undesired reheating of the modes as a result of a lengthy sideband cooling processes.

It is therefore desirable to devise alternate methods of cooling the collective motion of a trapped ion chain that reduces the overall duration of this process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method for cooling down ions in a chain of ions is described that includes performing a cooling down sequence in which phonons are removed from the ions in the chain of ions by exciting and de-exciting local motional modes associated with individual ions, where sideband transitions that are part of the cooling down sequence are driven faster for the local motional modes than for collective motional modes for the same chain of ions. The method further includes completing the cooling down sequence when the local motional modes reach a ground state.

In another aspect of this disclosure, a system for cooling down ions in a chain of ions is described that includes an optical controller configured to perform a cooling down sequence in which phonons are removed from the ions in the chain of ions by exciting and de-exciting local motional modes associated with individual ions, where sideband transitions that are part of the cooling down sequence are driven faster for the local motional modes than for collective motional modes for the same chain of ions. The optical controller is further configured to complete the cooling down sequence when the local motional modes reach a ground state.

In yet another aspect of this disclosure, a computer-readable storage medium configured to store code executable by a processor is described that includes code for performing a cooling down sequence in which phonons are removed from the ions in the chain of ions by exciting and de-exciting local motional modes associated with individual ions, wherein sideband transitions that are part of the cooling down sequence are driven faster for the local motional modes than for collective motional modes for the same chain of ions. The computer-readable storage medium further includes code for completing the cooling down sequence when the local motional modes reach a ground state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
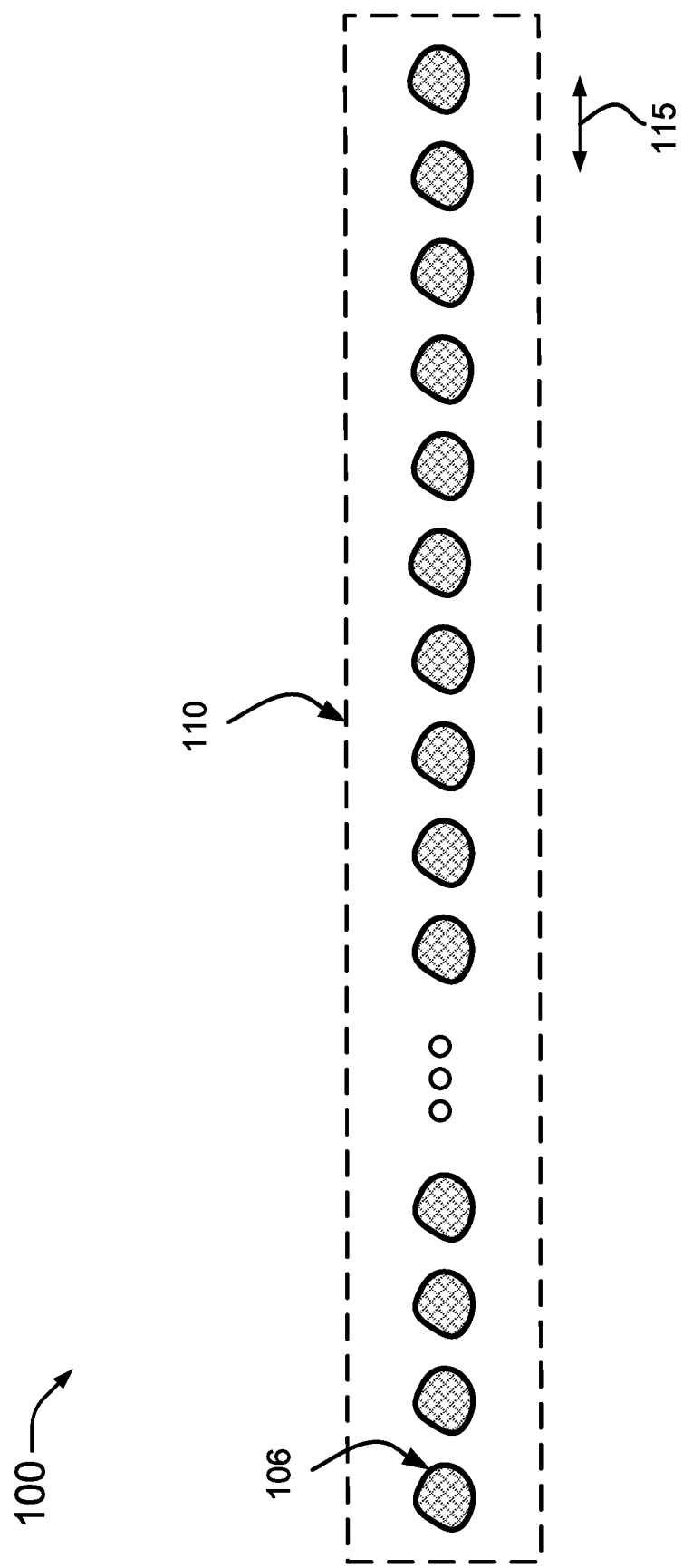
FIG. 1 illustrates an example of ions trapped in a linear or one-dimensional arrangement in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, by increasing the size of a trapped ion processor to increase computing capacity, the number of qubits or ions in the chain of ions used as the processor increases and the process of sideband cooling of the collective motional modes takes longer to achieve the cooling of all of the collective motional modes of the chain. This can prevent achieving the motional ground state of each of the collective motional modes because of a competing rate of heating of the trapped ions, leading to undesired reheating of the modes as a result of a lengthy sideband cooling processes. It is therefore desirable to devise alternate methods of cooling the collective motion of a trapped ion chain that reduces the overall duration of this process. One such method requires driving of the local motional mode sideband of each ion and using all ions in a chain in parallel during the cooling process.

Accordingly, the present disclosure describes the use of local modes of motion of individual ions in a chain for the cooling of the collective motional modes of the chain. Local modes can be excited if the motion of any ion in the chain is perturbed faster than the speed at which the excitation travels or hops to neighboring ions due to the strong electrostatic repulsion between the ion. By coherently driving the motional sideband transitions of the local motional modes corresponding to each ion of the chain, it may be possible to cool all local motional modes in parallel by driving all ions in the chain simultaneously. This approach leads to the cooling of the collective motional modes of the chain to near the ground state, which then improves the fidelity of gate operations in the ion trap processor. The overall cooling process using local motional modes is shorter compared to the cooling process using collective motional modes because of the use of multiple ions in the chain simultaneously during cooling, because the driving of sideband transitions resonant with the local motional modes are performed much faster than driving of sideband transitions resonant with the collective motional modes, and because the number of cooling cycles required is comparable or the same as that required in the collective motional mode cooling, which is governed by the initial temperature (average number of phonon excitations) of the ion chain.

Thus, the present disclosure describes a mechanism or scheme for more efficiently cooling long ion chains by using local modes of motion. Local modes of motion is not a concept or approach that is currently widely used in connection with ion traps, and typically only appears in the context of larger ion chains. For example, when there is a long chain of ions, a perturbation of the motion of single or individual ions in the chain (instead of collective motions of multiple or all ions in the chain) may take some time to propagate throughout the chain because the chain is very long. Until the motion begins to propagate it is merely a local motion of an ion. The chain of ions can be viewed as multiple masses (e.g., ions) that are connected by springs. When the ions in the chain oscillate together it is referred to as a collective motion and the various modes of oscillation as collective motional modes, collective modes of motion, or normal modes of motion. There may be collective motional modes when the entire chain oscillates at the same frequency. Moreover, there are as many collective motional modes as there are ions in the chain (e.g., there is a one-to-one correspondence between the number of collective motional modes and ions in the chain). During collective motional modes, the ions in the entire chain are in communication with each other as the whole chain moves together when viewed from a long time scale. In a short time scale, however, the motion of one ion affects the motion of another ion and if this is averaged over time it looks like a collective motional mode.

Collective motional modes can be used to implement quantum gates, such as two-qubit quantum gates, for example. In long chains of ions, collective motional modes form the medium of information exchange among the ions. For example, a two-qubit quantum gate can be implemented by entangling the qubits (e.g., the ions) with different ions in the chain using these normal or collective motional modes.

In order to achieve high fidelity in the quantum operations, it is necessary to cool down the collective motional modes by removing excitations from them. This may be done by cooling down the ions in the chain to a ground state (e.g., freeze the ions), and do so for each of the collective motional modes. One approach is to excite a particular collective motional mode, which has a particular resonant frequency, and while being resonant at that frequency, drive a sideband transition to remove the motional excitation by applying a laser beam on the ions to perform a Raman transition. Based on this approach, it is possible to remove unit packet, quanta, or phonons from the collective motional modes in order to cool them down.

This cooling down process can become very time and resource intensive. As the chains become longer there are many more collective motional modes to cool down because the number of motional modes increases linearly with the number of ions in the chain.

Another issue that arises is that even when the chain length increases (i.e., the number of ions is increased), the spacing between the ions in the ion chain (i.e., in the trap holding the ions) does not change. This is because the spacing between ions is dictated by limitations in the optics used in the system and/or by the way in which light is collected from the ions. That is, the various optical set ups that enable control and manipulation of the ions in the chain are typically optimized for a certain spacing between the ions (e.g., typically in a range of 3-6 microns). Therefore, the spacing between the ions in the chain is system-dependent and typically remains the same.

FIG. 1 shows a diagram 100 that illustrates multiple atomic ions 106 trapped in a linear or one-dimensional arrangement, e.g., a linear crystal or chain of ions 110, and having a same spacing 115 between atomic ions 106. As used in this disclosure, the terms "atomic ions" and "ions" may be used interchangeably. The ions 106 may be trapped and configured into the chain 110 by using a linear radio frequency (RF) trap such as a linear RF Paul trap (the chain 100 can be inside a vacuum chamber not shown). In the example shown in FIG. 1, the trap may include electrodes for trapping multiple Ytterbium ions (e.g., $^{171}Yb^+$ ions) which are confined in the chain 110 and are laser-cooled to be nearly at rest. Other atomic species may also be used. The number of atomic ions trapped can be configurable and more or fewer atomic ions may be trapped than those shown in FIG. 1. In an example, the number of ions that may be trapped is N, where N>1 and where N is a number as large as 100 or even larger, with some implementations having N=32. The ions are illuminated with laser (optical) radiation tuned to a resonance in $^{171}$Yb$^+$ and the fluorescence of the ions may be imaged onto a camera. In this example, ions may be separated by about 5 microns (μm) from each other as may be shown by fluorescence. The separation of the atomic ions is a function of a balance between the external confinement force and Coulomb repulsion, and is conditioned, as described above, on the optimization of the optical set ups that enable control and manipulation of the ions in the chain 110.

By increasing the number of ions in the chain 110 so that a quantum processor (e.g., a processor based on qubits made from the ions in the chain 110) can have more qubits, the number of collective motional modes associated with the chain 110 also increases. Since the size of the chain 110 does not change significantly even as more ions are added given the small spacing between ions, the frequencies associated with an increasing number of collective motional modes start to get closer together. This may be referred to as spectral crowding. In such a case, while it is desirable to drive each collective motional mode separately during the cooling process, it may become difficult to preferentially drive one collective motional mode without driving another collective motional mode as their frequencies get close together. To avoid exciting another collective motional mode, the collective motional mode under consideration needs to be driven very slowly. Therefore, the cooling down of collective motional modes is fundamentally limited by the time scales that are needed to properly drive the collective motional modes. As a result, when trying to perform the cooling down of the collective motional modes by removing phonons using a sideband transition, the overall time it takes for a sequence needed to cool down the collective motional modes can become really long, affecting the ability of having a quantum computing system quickly available and ready to perform a quantum operation.

Figure 2A:
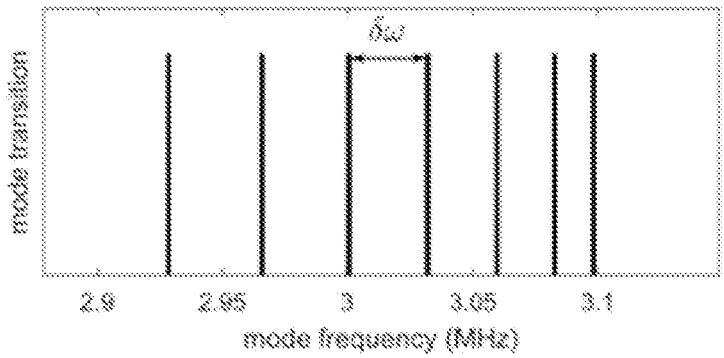
FIGS. 2A-2C illustrate examples of different collective mode frequencies for trapped ion chains in accordance with aspects of the disclosure.
Figure 2B:
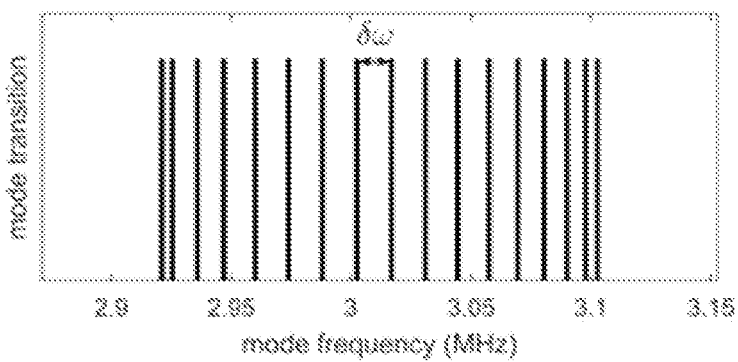
Figure 2C:
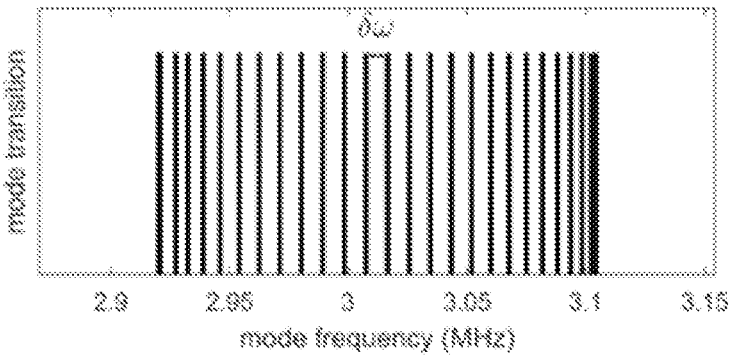

FIGS. 2A-2C illustrate diagrams 200a-200c, which show examples of different collective mode frequencies for trapped ion chains in accordance with aspects of the disclosure. Each of the diagrams shows various collective motional modes for trapped ion chains having different number of ions within a frequency band. The diagram 200a in FIG. 2A corresponds to an ion chain having 7 ions and therefore 7 frequencies are shown for the collective motional modes. The diagram 200b in FIG. 2B corresponds to an ion chain having 17 ions and therefore 17 frequencies are shown for the collective motional modes. Similarly, the diagram 200c in FIG. 2C corresponds to an ion chain having 27 ions and therefore 27 frequencies are shown for the collective motional modes. In this example, the transverse confinement and the average spacing between adjacent ions in the chain are kept constant for all cases at 3 MHz and 4.3 microns, respectively. These calculations show that as the chain length is increased in a trapped-ion processor, spectral crowding of collective motional modes occurs where the spacing between adjacent mode frequencies, shown as δω, decreases in value. The value of δω may therefore refer to a frequency splitting between any two collective or normal motional modes. Thus, δω dictates how slowly to drive the sidebands of the collective motional modes to cool down the modes. As δω goes down, the cooling duration goes up as $1/\delta\omega$.

Figure 3:
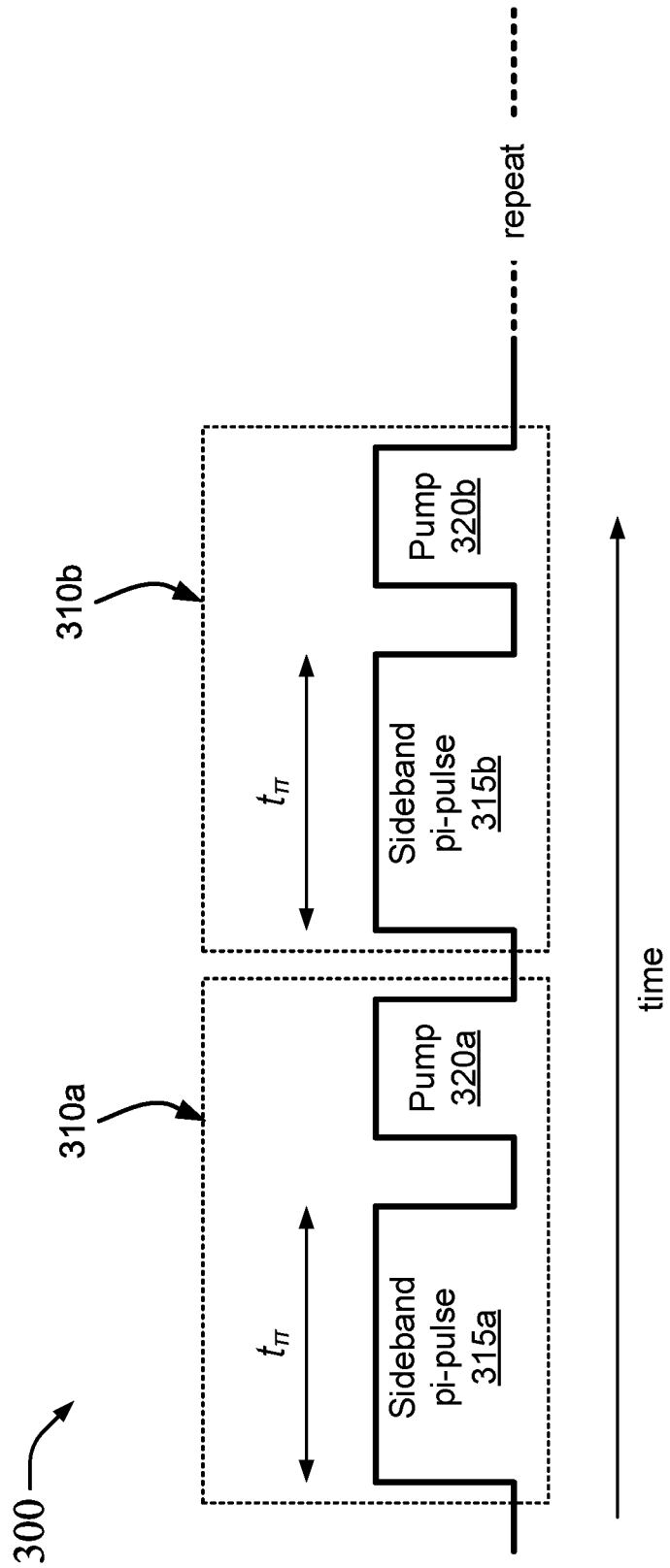
FIG. 3 is a diagram illustrating an example a sideband cooling sequence in accordance with aspects of the disclosure.

FIG. 3 illustrates a diagram 300 an example a sideband cooling sequence as described above, where the sideband cooling sequence consists of repetitive cycles of sideband pi-pulses and optical pumping of the qubit. For example, a first cycle 310a is shown to have a sideband pi-pulse 315a followed by an optical pumping 320a. A second cycle 310b is shown to have a sideband pi-pulse 315b followed by an optical pumping 320b. Similar cycles are then repeated. The sideband pi-pulses (e.g., 315a, 315b) are used to remove a phonon but they also change the spin state of the qubit. The optical pumping (e.g., 320a, 320b) are then used to bring the spin state back to its original form. The sideband pi-pulses are of duration $t_\pi$, which is set by the choice of sideband cooling scheme used. A collective motional mode sideband cooling scheme requires $t_\pi > 1/\delta\omega$), such that each mode is individually resolved and addressed. The number of cycles required for cooling the motion of the ion chain to near ground state is proportional to the average vibrational/phonon excitation in each collective motional mode. Because of spectral crowding as shown in FIGS. 2A-2C, the collective motional mode sideband cooling gets slower with increasing chain length (i.e., the number of ions in the chain). In other words, as the frequencies become more crowded and ωm becomes smaller when the number of ions in the chain increases, the duration of the sideband pi-pulses (e.g., 315a, 315b) gets longer.

To reduce the time it takes to cool down the motion of the ion chain to near ground state, and to avoid making such process significantly longer as the number of ions increases, the present disclosure proposes the use of local motional modes or local modes of motion instead of the collective motional modes. There are some advantages to this approach. Because the process involves the removal of phonons, cooling down the local motional modes achieves the same result as cooling down the collective motional modes by cooling down the ion and removing motional excitations. That is, since there is a relationship (e.g., a linear transformation) between collective and local motional modes, the removal of phonons has the same effect in both contexts.

To remove phonons using the local motional modes and sideband transitions, and to ensure that the phonons are being removed from the local motional modes, it is important to drive that transition really fast. So this approach by default increases the operational speed of the cooling down process. The reason to drive the transitions fast is because the concept of the local motional mode is only valid in the context of really short time scales. Therefore, local motional modes need to be driven faster than they can hop or jump from one ion to a neighboring ion. Generally, if an ion is made to move in its position it tends to perturb neighboring ions. However, if the ion is made to move fast enough, faster than information can travel from the ion to neighboring ions, then it is possible to excite or de-excite the ion without affecting the neighboring ions. This approach allows for the local motional modes are used and speeds up the cooling down process.

Figure 4:
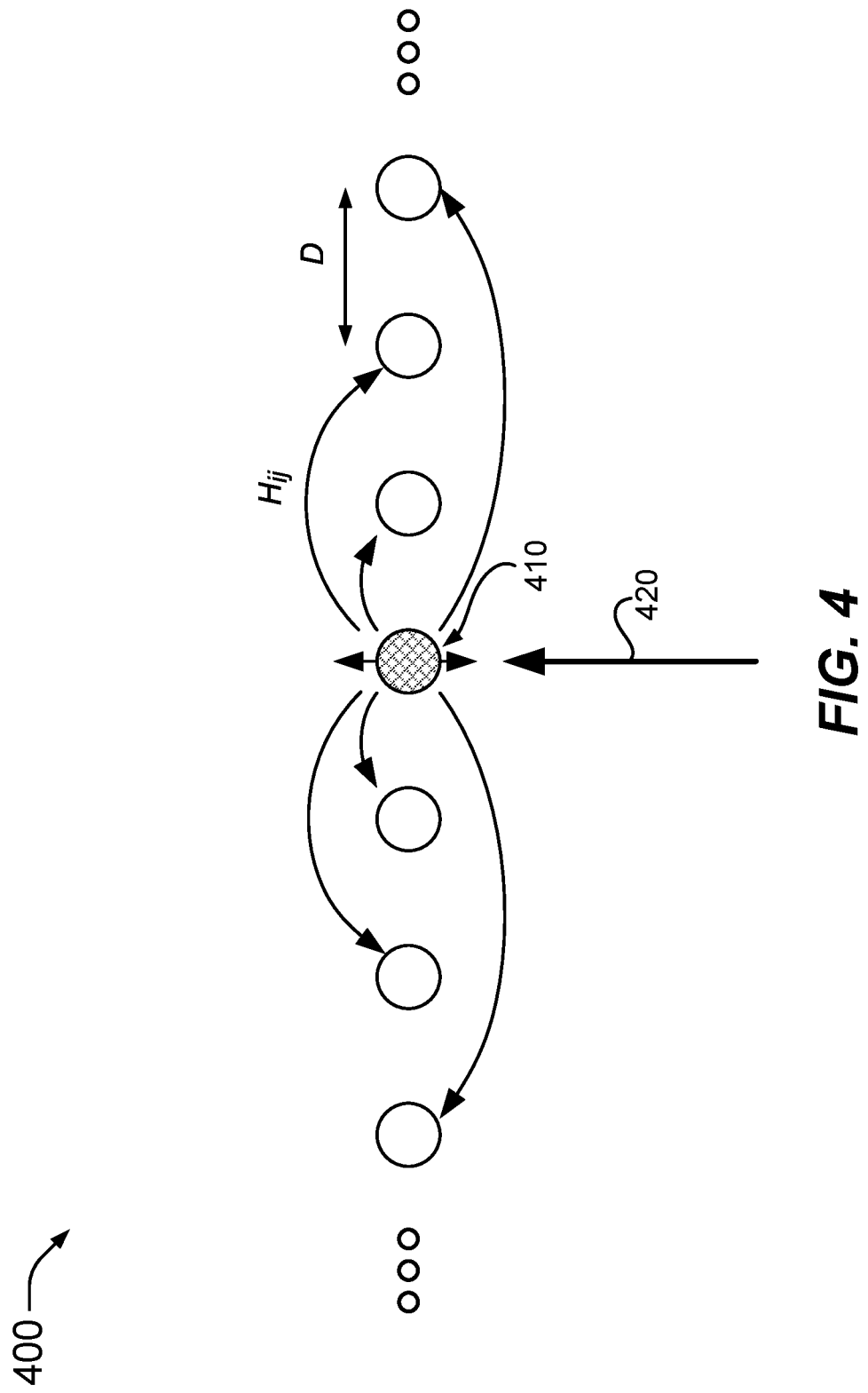
FIG. 4 is a diagram illustrating an example of a local motional mode of a single ion in an ion chain in accordance with aspects of the disclosure.

FIG. 4 shows a diagram 400 illustrating an example of a local motional mode of a single ion 410 in an ion chain. The diagram 400 shows few ions inside a longer ion chain where the local motional mode of a single ion 410 (e.g., ion i) is excited or de-excited using a laser beam 420 that changes its local transverse motional excitation or phonon number. This local transverse motion is in the direction shown by solid black arrows (e.g., up-down arrows about the ion 410). Due to electrostatic repulsion of this ion with neighboring ions, this local mode excitation may hop or jump from the ion 410 (e.g., the ion i) to its neighboring ions j at a rate Hij. The rate of hopping is determined by the uniform spacing between ions D (e.g., spacing 115 in the diagram 100 in FIG. 1).

Figure 5:
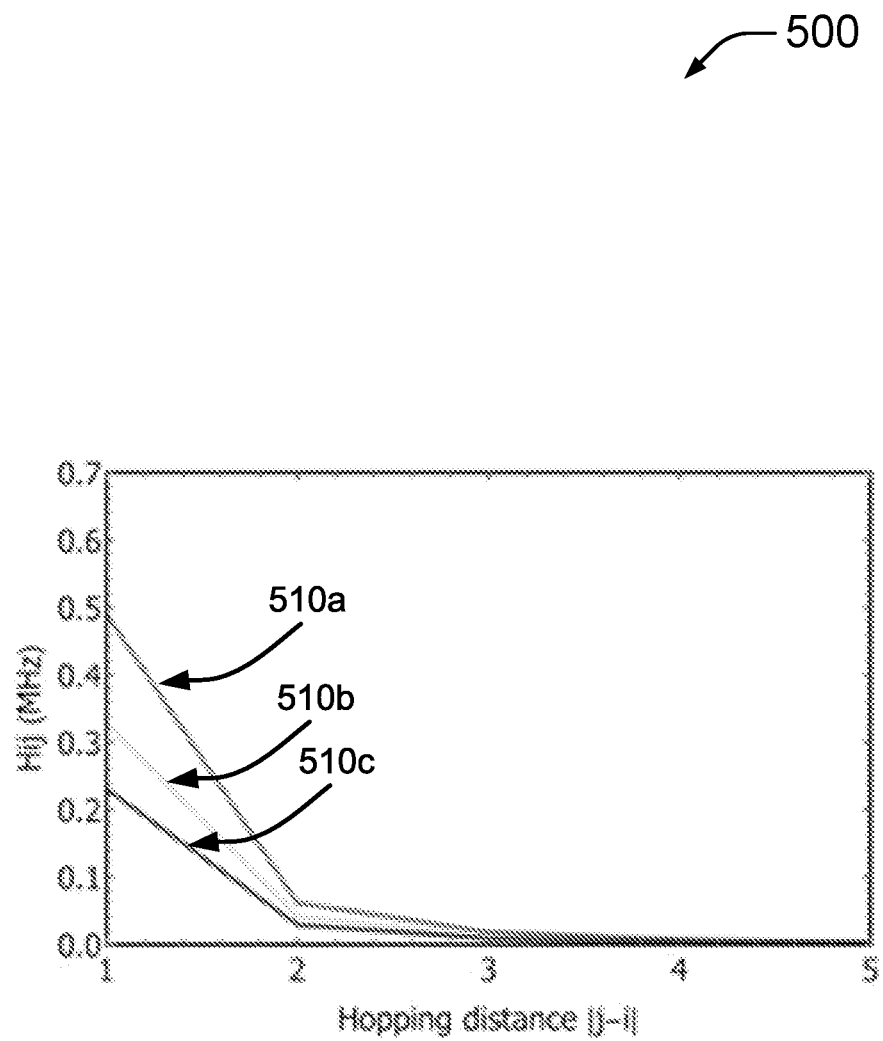
FIG. 5 is a diagram illustrating an example of a hopping rate between ions in a trapped ion chain in accordance with aspects of the disclosure.

FIG. 5 shows a diagram 500 illustrating an example of a hopping rate between ions in a trapped ion chain. This particular example shows the rate of hopping between ions in a chain of trapped Ytterbium ions with uniform transverse confinement of about 3 MHz with a variable but uniformly (or nearly uniformly) set spacing between the ions of a chain. The line 510a correspond to the hopping rate when the ion spacing (e.g., D) is 3.5 microns, while lines 510b and 510c correspond to the hopping rate when the ion spacing is 4 microns and 4.5 microns, respectively. The hopping rate is dependent on the ion spacing and not on the overall length of the chain. Moreover, the hopping rate is strongest between nearest neighboring ions and decreases quickly as a cube of the distance between ions. Therefore it is necessary to manipulate local motional modes (e.g., local phonon modes) of each ion during a local mode sideband cooling protocol as shown in the diagram 300 in FIG. 3 using $t_\pi < 1/H_{i,i+1}$. This requires much faster sideband-pi pulses (e.g., sideband pi-pulses 315a, 315b) compared to those used in collective motional mode sideband cooling. Faster sideband-pi pulses may require more laser power (e.g., larger power for the laser beam 420 in the diagram 400 in FIG. 4) to be used so that the modes are driven faster. However, the number of repetitions required is the same as it is still set by the initial temperature of the ion chain. Additionally, it is possible to use multiple laser beams, each tuned to de-excite individual ions of the chain simultaneously thereby cooling the local motional modes in parallel. The interspersed pump durations (e.g., pump 320a, 320b) allows the local motional mode de-excitations to propagate over the entire chain thereby cooling the collective motion of the chain. Therefore, the local motional mode sideband cooling technique dramatically reduces the overall duration for cooling of a long ion chain to its motional ground state.

The diagram 500 generally shows that the hopping rate falls very quickly with distance and it does not change substantially when changing the spacing between ions in the chain. Therefore, when manipulating local motional modes, the rate at which the local motional modes are driven is governed mainly by the spacing between the ions and not so much by the size of the chain. On the other hand, and as described above, the size of the chain (i.e., the number of ions or qubits in the chain) does depend on the frequency splitting between any two collective or normal motional modes, $\delta\omega$.

As described above, the cooling down process using local motional modes can be performed in parallel, that is, each of the ions in the chain can be individually and concurrently driven fast enough such that the local motion of the ion can be de-excited without information traveling from the ion to any neighboring ions. If the information were to travel to a neighboring ion before the one ion is de-excited, then control of the local motional mode may be lost.

Driving the local motional modes in parallel has at least two benefits. First, the local motional modes need to be driven fast and this makes by default the process faster, and second, it is possible to drive all local motional modes at the same time (e.g., simultaneously or concurrently), which also expedites processing.

In addition, it is not necessary to drive all of the ions to cool the local motional modes. It is possible to drive just a few ions in the chain for which there is an experimental level of comfort. For example, the chain of ions may have some ions that are considered operational ions, that is, ions used as qubits for various operations, computations, or experiments. There may be one or more ions in the chain referred to as spectator ions, which are used to help stabilize the chain but for which Raman transitions are not performed.

Whether all of the ions in the chain are driven or just a subset of the ions in the chain are driven it is possible to cool down the entire chain because after removing phonon excitations from the local motional modes, the information travels fast across the chain. That is, after removing energy from one ion (e.g., by removing one or more phonons) it is essentially removed from the whole set of ions in the chain because energy will flow back into that ion from the rest of ions in the chain. Unlike collective or normal motional modes, which are stable eigen modes of oscillation and are independent from each other, local motional modes tend to interact with each other. For example, and as described above, if a phonon is removed from one local motional mode another local motional mode may lose a phonon that may hop over to fill out the phonon that was removed. Therefore, it is possible to cool down the entire chain because local modes interact with each other. This can be done by performing a number of cooling cycles to remove all of the phonons of the local motional modes in the system and bring those modes to the ground state, which also implies that the collective or normal motional modes in the system are in the ground state. It is therefore possible to achieve collective motional modes in the ground state by cooling down the local motional modes really fast.

Figure 6:
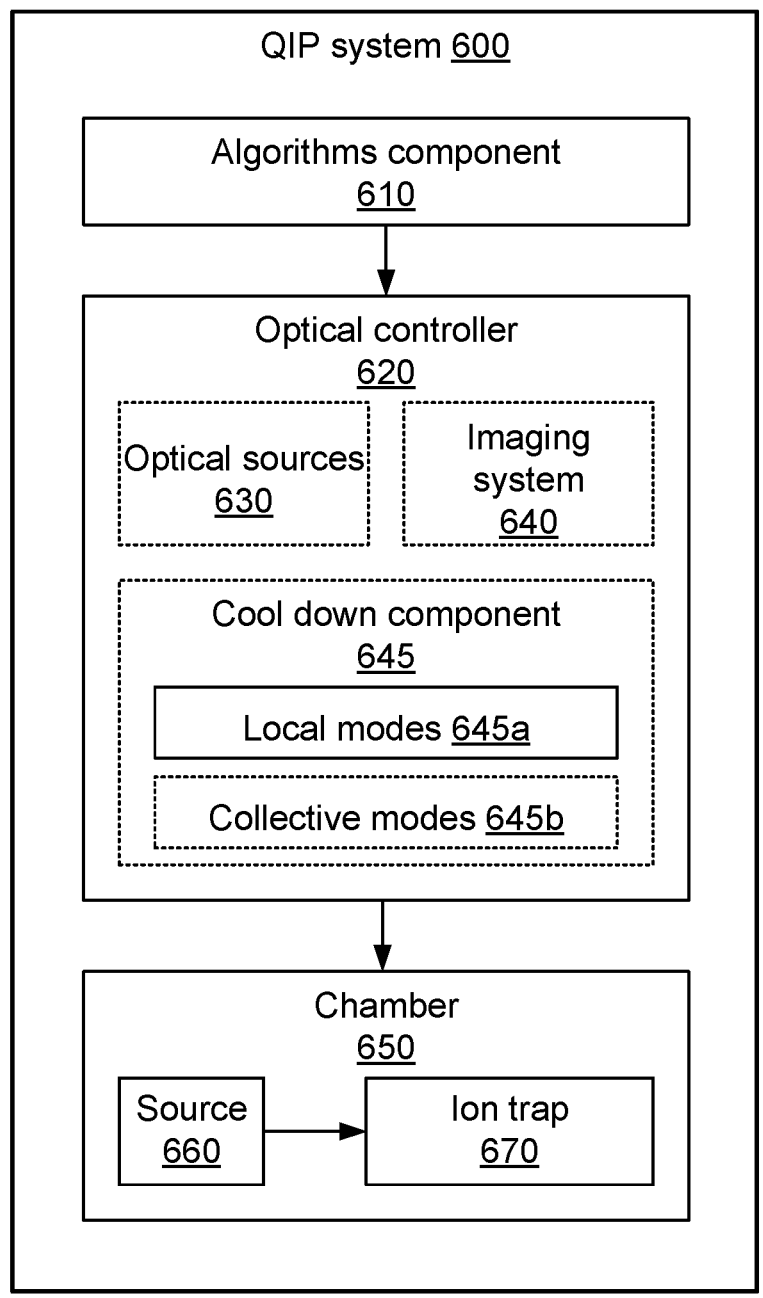
FIG. 6 is a block diagram illustrating an example of a quantum information processing (QIP) system in accordance with aspects of this disclosure.

FIG. 6 is a block diagram illustrating an example of a quantum information processing (QIP) system 600 in accordance with aspects of this disclosure. The QIP system 600 may also be referred to as a quantum computing system, a computer device, a trapped ion system, a trapped ion quantum computer, or the like. In an aspect, the QIP system 600 may be configured to perform quantum computations and quantum experiments. Moreover, the QIP system 600 may be configured to perform cooling of ions in a chain of ions to prepare the chain to be used as a processor or part of a processor. More specifically, the QIP system 600 may be configured to perform fast cooling of ion motion in a chain using local motional modes. Alternatively, the QIP system 600 may be configured to perform cooling of ion motion in a chain using collective or normal motional modes. The length of the chain of ions may vary, that is, the number of ions (e.g., qubits) in the chain can be dynamically be increased or decreased.

The QIP system 600 can include a source 660 that provides atomic species (e.g., a flux of neutral atoms) to a chamber 650 having an ion trap 670 that traps the atomic species once ionized (e.g., photoionized) by an optical controller 620. The ion trap 670 may be used to trap ions into a linear array such as the chain 110 described above in connection with the diagram 100 in FIG. 1. The ion trap 670 may be considered to be a trapped ion processor or part of one. Optical sources 630 in the optical controller 620 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 640 in the optical controller 620, and/or to perform the cool down functions described in this disclosure. The optical sources 630 may be configured to control and generate a linear array of laser beams to perform parallel operations on the ions of the chain in the ion trap 670. In an aspect, the optical sources 630 may be implemented separately from the optical controller 620.

The imaging system 640 can include a high resolution imager (e.g., CCD camera) for monitoring the atoms while they are being provided to the ion trap 670 and/or the atoms after they have been provided to the ion trap 670 and photoionized. In an aspect, the imaging system 640 can be implemented separate from the optical controller 620, however, the use of fluorescence to detect, identify, label, and/or control atomic ions using image processing algorithms may need to be coordinated with the optical controller 620.

The QIP system 600 may also include an algorithms component 610 that may operate with other parts of the QIP system 600 (not shown) to perform quantum algorithms or quantum operations, including a stack or sequence of combinations of single qubit operations and/or multi-qubit operations (e.g., two-qubit operations) as well as extended quantum computations. As such, the algorithms component 610 may provide instructions to various components of the QIP system 600 (e.g., to the optical controller 620) to enable the implementation of the quantum algorithms or quantum operations.

The optical controller 620 may include a cool down component 645 that is configured to control various aspects of a cool down operation. For example, the cool down component 645 may control a sequence of cycles as described above in connection with the diagram 300 in FIG. 3. In this regard, the cool down component 645 may control the duration of the sideband pi-pulses (e.g., the sideband pi-pulses 315*a*, 315*b*), the duration of the optical pumping (e.g., the pumps 320*a*, 320*b*), and/or the number and timing of sequence cycles (e.g., the cycles 310*a*, 310*b*).

The cool down component 645 may include a local modes 645*a*, which is a component configured to control and handle all aspects described herein for using local motional modes to cool down the ions in an ion chain. The cool down component 645 may optionally include a collective modes 645*b*, which is a component configured to control and handle all aspects described herein for using collective motional modes to cool down the ions in an ion chain. The cool down component 645 may be configured to select its operation to be based on the use of local motional modes (e.g., local modes 645*a*) or collective motional modes (e.g., collective modes 645*b*).

Figure 7:
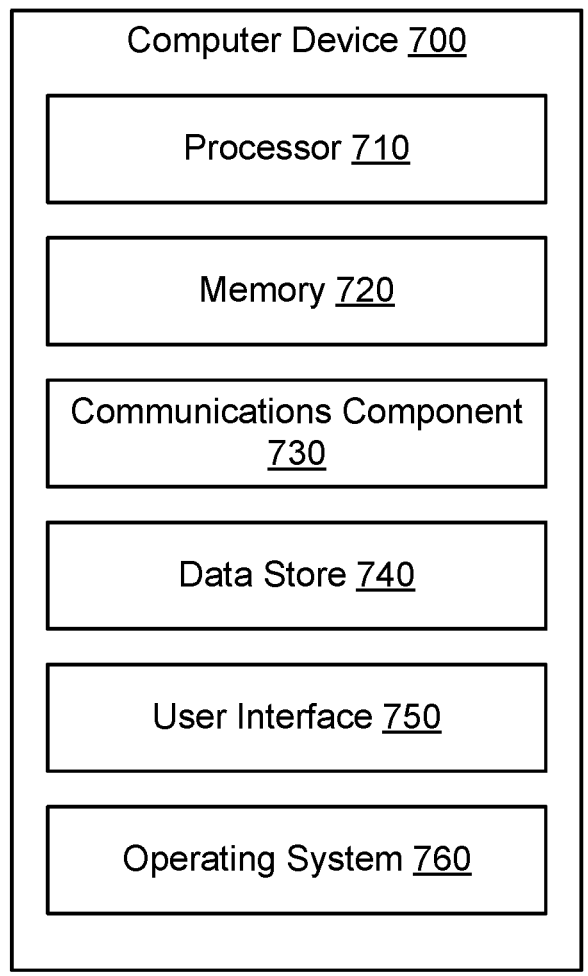
FIG. 7 is a block diagram illustrating an example of a computer device in accordance with aspects of this disclosure

Referring now to FIG. 7, illustrated is an example computer device 700 in accordance with aspects of the disclosure. The computer device 700 can represent a single computing device, multiple computing devices, or a distributed computing system, for example. The computer device 700 may be configured as a quantum computer (e.g., a QIP system), a classical computer, or a combination of quantum and classical computing functions. For example, the computer device 700 may be used to process information using quantum algorithms based on trapped ion technology and may therefore implement some of the techniques described in which local motional modes are used to cool down the ions in a chain of ions. A generic example of the computer device 700 as a QIP system that can implement the techniques described herein is illustrated in the example described above in connection with FIG. 6 and the QIP system 600.

In one example, the computer device 700 may include a processor 710 (e.g., a trapped ion processor) for carrying out processing functions associated with one or more of the features described herein. For example, the processor 710 may be configured to control, coordinate, and/or perform aspects of manipulating quantum information stored in an ion or atom. The processor 710 may include a single or multiple set of processors or multi-core processors. Moreover, the processor 710 may be implemented as an integrated processing system and/or a distributed processing system. The processor 710 may include a central processing unit (CPU), a quantum processing unit (QPU), a graphics processing unit (GPU), or combination of those types of processors. In one aspect, the processor 710 may refer to a general processor of the computer device 700, which may also include additional processors 710 to perform more specific functions. The processor 710 may involve using one or more trapped ions to perform quantum operations, algorithms, or simulations.

In an example, the computer device 700 may include a memory 720 for storing instructions executable by the processor 710 for carrying out the functions described herein. In an implementation, for example, the memory 720 may correspond to a computer-readable storage medium that stores code or instructions to perform one or more of the functions or operations described herein. In one example, the memory 720 may include instructions to perform aspects of a method 800 described below in connection with FIG. 8. Just like the processor 710, the memory 720 may refer to a general memory of the computer device 700, which may also include additional memories 720 to store instructions and/or data for more specific functions.

Further, the computer device 700 may include a communications component 730 that provides for establishing and maintaining communications with one or more parties utilizing hardware, software, and services as described herein. The communications component 730 may carry communications between components on the computer device 700, as well as between the computer device 700 and external devices, such as devices located across a communications network and/or devices serially or locally connected to computer device 700. For example, the communications component 730 may include one or more buses, and may further include transmit chain components and receive chain components associated with a transmitter and receiver, respectively, operable for interfacing with external devices.

Additionally, the computer device 700 may include a data store 740, which can be any suitable combination of hardware and/or software, that provides for mass storage of information, databases, and programs employed in connection with implementations described herein. For example, the data store 740 may be a data repository for operating system 760 (e.g., classical OS, or quantum OS). In one implementation, the data store 740 may include the memory 720.

The computer device 700 may also include a user interface component 750 operable to receive inputs from a user of the computer device 700 and further operable to generate outputs for presentation to the user or to provide to a different system (directly or indirectly). The user interface component 750 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 750 may include one or more output devices, including but not limited to a display, a speaker, a haptic feedback mechanism, a printer, any other mechanism capable of presenting an output to a user, or any combination thereof.

In an implementation, the user interface component 750 may transmit and/or receive messages corresponding to the operation of the operating system 760. In addition, the processor 710 may execute the operating system 760 and/or applications or programs, and the memory 720 or the data store 740 may store them.

When the computer device 700 is implemented as part of a cloud-based infrastructure solution, the user interface component 750 may be used to allow a user of the cloud-based infrastructure solution to remotely interact with the computer device 700.

Figure 8:
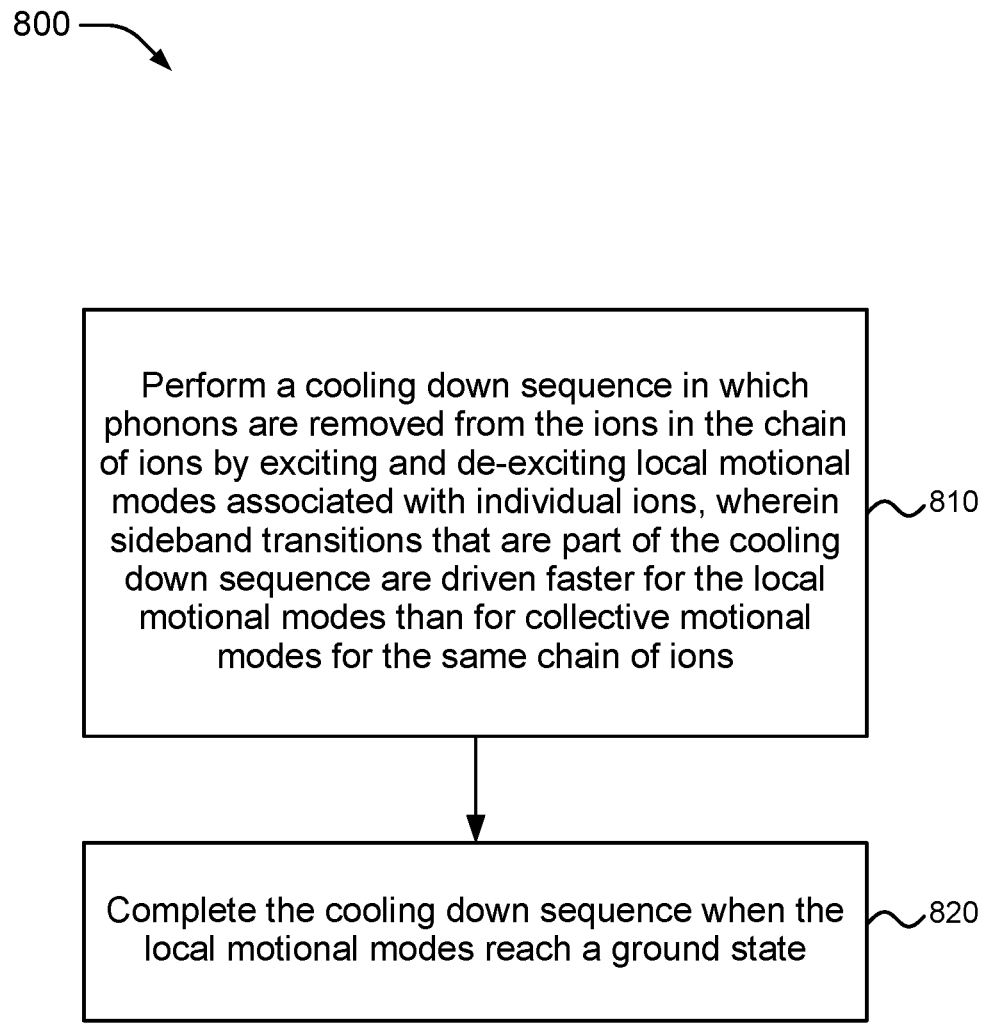
FIG. 8 is a flow diagram that illustrates an example of a method in accordance with aspects of this disclosure

FIG. 8 is a flow diagram that illustrates an example of a method 800 for cooling down ions in a chain of ions in accordance with aspects of this disclosure. In an aspect, the functions of the method 800 may be performed by one or more components of a trapped ion system or a QIP system such as the QIP system 600 and its components (e.g., optical controller 620 and its components or subcomponents). Similarly, the functions of the method 800 may be performed by one or more components of a computer device such as the computer device 700 and its components.

In 810, the method 800 includes performing a cooling down sequence (see e.g., the diagram 300 in FIG. 3 as applied to local motional modes) in which phonons are removed from the ions in the chain of ions by exciting and de-exciting local motional modes associated with individual ions, where sideband transitions that are part of the cooling down sequence are driven faster for the local motional modes than for collective motional modes for the same chain of ions. The ions in the chain of ions can be Ytterbium ions, although other types of ions can also be used.

In 820, the method 800 includes completing the cooling down sequence when the local motional modes reach a ground state.

In another aspect of the method 800, performing the cool down sequence includes generating a laser beam for exciting and de-exciting each of the local motional modes.

In another aspect of the method 800, performing the cool down sequence includes exciting and de-exciting the local motional modes associated of multiple ions in parallel.

In another aspect of the method 800, the ions in the chain of ions include operational ions and spectator ions, and performing the cool down sequence includes exciting and de-exciting the local motional modes associated with the operational ions.

In another aspect of the method 800, the ions in the chain of ions are uniformly (or nearly or substantially uniformly) spaced and a spacing between the ions is in a range of 3 microns to 6 microns.

In another aspect of the method 800, the cooling down sequence includes multiple cycles, wherein each cycle has a sideband transition in the form of a sideband-pi pulse and an optical pumping, and wherein a duration of the sideband-pi pulse ($t_\pi$) is shorter than or of the same order as an inverse of a hopping rate between the excited ion and its nearest neighbor ion (1/Hi, i+1). The hopping rate may be dictated by the spacing between the ions of a chain and the charge and mass of the particular species of ion being used. For example, the hopping can be in a range of 0.2 MHz to 0.5 MHz when a spacing between trapped Ytterbium ions is in a range of 3.5 microns to 4.5 microns (see e.g., the diagram 500 in FIG. 5).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A system for cooling down ions in a chain of ions, the system comprising:
   an optical controller; and
   a plurality of optical sources controlled by the optical controller, such that the plurality of optical sources are configured to:
      perform a cooling down sequence in which phonons are removed from the ions in the chain of ions by exciting and de-exciting local motional modes associated with individual ions, wherein sideband transitions that are part of the cooling down sequence are driven faster for the local motional modes than for collective motional modes for the chain of ions, and
      complete the cooling down sequence when the local motional modes reach a ground state.

2. The system of claim 1, wherein the plurality of optical sources is further configured to generate laser beams for exciting and de-exciting each of the local motional modes.

3. The system of claim 1, wherein the plurality of optical sources configured to perform the cool down sequence is further configured to perform the exciting and de-exciting of the local motional modes associated with multiple ions in parallel.

4. The system of claim 1, wherein each of the plurality of optical sources is individually controllable for generating multiple laser beams to excite and de-excite the local motional modes associated of multiple ions in parallel.

5. The system of claim 1, further comprising an ion trap configured to hold the ions in the chain of ions, wherein the ions in the chain of ions include operational ions and spectator ions, and wherein the plurality of optical sources is configured to perform the cool down sequence to excite and de-excite the local motional modes associated with the operational ions.

6. The system of claim 1, further comprising an ion trap configured to hold the ions in the chain of ions, wherein the ions in the chain of ions are nearly or substantially uniformly spaced within the ion trap and a spacing between the ions is in a range of 3 microns to 6 microns.

7. The system of claim 1, wherein the cooling down sequence includes multiple cycles, wherein each cycle has a sideband transition in the form of a sideband-pi pulse and an optical pumping, and wherein a duration of the sideband-pi pulse ($t_{90}$) is shorter than or of the same order as an inverse of a hopping rate between the excited ion and its nearest neighbor ion (1/Hi, i+1).

8. The system of claim 7, wherein the hopping rate is in a range of 0.2 MHz to 0.5 MHz when a spacing between the ions is in a range of 3.5 microns to 4.5 microns.

9. A method for cooling down ions in a chain of ions, comprising:
   performing a cooling down sequence to remove phonons from the ions in the chain of ions by:
      exciting and de-exciting local motional modes associated with individual ions in the chain of ions, and driving first sideband transitions for the local motional modes faster than second sideband transitions for collective motional modes for the chain of ions; and
completing the cooling down sequence when the local motional modes reach a ground state;
wherein performing the cooling down sequence comprises causing a plurality of optical sources to generate laser beams for exciting and de-exciting each of the local motional modes.

10. The method of claim 9, wherein performing the cooling down sequence comprises performing the exciting and de-exciting of the local motional modes associated with multiple ions in parallel.

11. The method of claim 9, wherein performing the cooling down sequence comprises causing a plurality of optical sources to generate laser beams by individually controlling each of the plurality of optical sources to generate multiple laser beams to excite and de-excite the local motional modes associated of multiple ions in parallel.

12. The method of claim 9, further comprises holding the ions in the chain of ions, wherein the ions in the chain of ions include operational ions and spectator ions, and wherein performing the cooling down sequence comprises performing the cool down sequence to excite and de-excite the local motional modes associated with the operational ions.

13. The method of claim 9, further comprises holding the ions in the chain of ions, wherein the ions in the chain of ions are nearly or substantially uniformly spaced within the ion trap and a spacing between the ions is in a range of 3 microns to 6 microns.

14. The method of claim 9, wherein performing the cooling down sequence comprises performing the cooling down sequence in multiple cycles, wherein each cycle has a sideband transition in the form of a sideband-pi pulse and an optical pumping, and wherein a duration of the sideband-pi pulse ($t_\pi$) is shorter than or of the same order as an inverse of a hopping rate between the excited ion and its nearest neighbor ion ($1/H_{i, i+1}$).

15. The method of claim 14, wherein the hopping rate is in a range of 0.2 MHz to 0.5 MHz when a spacing between the ions is in a range of 3.5 microns to 4.5 microns.

16. The method of claim 9, wherein the ions in the chain of ions are Ytterbium ions.

* * * * *